(12) United States Patent
AliKacem et al.

(10) Patent No.: US 7,818,723 B2
(45) Date of Patent: Oct. 19, 2010

(54) ANTIPATTERN DETECTION PROCESSING FOR A MULTITHREADED APPLICATION

(75) Inventors: El Hachemi AliKacem, Montreal (CA); Sergiy Boroday, Montreal (CA); Hesham Hallal, Montreal (CA); Alexandre Petrenko, Montreal (CA); William Patrick Tunney, Toms River, NJ (US)

(73) Assignee: SAP AG, Walldorf (DE)

( * ) Notice: Subject to any disclaimer, the term of this patent is extended or adjusted under 35 U.S.C. 154(b) by 885 days.

(21) Appl. No.: 11/069,111

(22) Filed: Feb. 28, 2005

(65) Prior Publication Data

US 2006/0053422 A1  Mar. 9, 2006

Related U.S. Application Data

(60) Provisional application No. 60/607,868, filed on Sep. 7, 2004.

(51) Int. Cl.
*G06F 9/44* (2006.01)
(52) U.S. Cl. .................................................. 717/131
(58) Field of Classification Search ......... 717/100–103, 717/124–128, 131–133
See application file for complete search history.

(56) References Cited

U.S. PATENT DOCUMENTS 6,851,105 B1 * 2/2005 Coad et al. .................. 717/106

OTHER PUBLICATIONS

Smith and Williams, "New Software Performance AntiPatterns: More Ways to Shoot Yourself in the Foot", 2002, Performance Engineering Services and Software Engineering Research, pp. 1-8.*
Smith and Williams, "Software Performance AntiPatterns", Sep. 2000, Performance Engineering Services and Software Engineering Research, pp. 1-11.*
Smith and Williams, "PASA: An Architecture Approach to Fixing Software Performance Problems", Performance Engineering Services and Software Engineering Research, pp. 1-15.*
Gyarmati et al., "Software Performance Prediction—using SPE", Jun. 2002, Department of Software Engineering and Computer Science, Blekinge Institute of Technology, Sweden, pp. i-iii, 1-33.*
Kauppi, "Performance Analysis at the Software Architecture Level", 2003, VTT Publications 512, pp. 1-81.*

* cited by examiner

*Primary Examiner*—Ted T Vo
(74) *Attorney, Agent, or Firm*—Schwegman, Lundberg & Woessner, P.A.

(57) ABSTRACT

A method of analyzing a multithreaded application for an antipattern is presented. An antipattern test is selected from a library of available antipatterns. An analysis tool is determined in response to the selected antipattern. The analysis tool is processed against the multithreaded application for the selected antipattern for purposes of detecting coding deficiencies in the multithreaded application as defined by the antipattern.

17 Claims, 3 Drawing Sheets

ANTIPATTERN DETECTION PROCESSING FOR A MULTITHREADED APPLICATION

RELATED APPLICATIONS

This application claims the priority benefit of U.S. Provisional Application No. 60/607,868, filed Sep. 7, 2004, which is incorporated by reference herein.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screen shots which may be described below and in the drawings that form a part of this document: Copyright 2005, SAP, Aktiengesellschaft. All Rights Reserved.

FIELD OF THE INVENTION

The invention relates generally to software analysis and more particularly to the analysis of multithreaded software.

BACKGROUND OF THE INVENTION

Multithreading is a technique which enables the concurrent execution of several threads (e.g., "light weight" processes) within the same program and is a convenient way to decompose a program into several relatively independent tasks, thereby increasing overall efficiency of the program. This programming technique has been closely associated with Java, which was designed with multithreading in mind.

It has however been found that, despite the benefits of multithreading, the development, testing and maintenance of multithreaded applications are typically difficult tasks and are time-consuming. This is mainly due to the fact that multithreading is associated with both concurrency and non-determinism. Unlike sequential applications, a multithreaded application, with its unpredictable thread scheduling and inherent parallelism, may have several execution paths for the same input data. It follows that an error that occurs during the execution of a program might not be reproducible by simply re-executing the program, thereby making the error difficult to detect. It further follows that traditional testing and debugging methods are inefficient for the detection of multithreading related problem.

Although many sophisticated formalisms, models and techniques have been developed and introduced for identifying concurrency associated defects, they have not always been found to be easily applicable and ready to be integrated into development processes. This is due to the complexity of some of the techniques, the steep learning curve to master modeling and reasoning methodologies, and the scalability concerns associated with large systems.

Meanwhile, numerous mistakes can either be detected or avoided by simpler means, especially when these errors are caused by erroneous syntactic constructions or known bogus programming styles. There is a high tendency in recent works to profit from the improvement that the concept of design patterns has brought to the development of software applications. The main idea is to consider representing common errors that are known to occur frequently in large number of applications or that are shared by several programmers by patterns of errors that could be generalized in a way to facilitate their detection and refactoring. The notion of an "antipattern," something that looks like a good idea, but which backfires badly when applied is being used increasingly in the testing and debugging phases of programming and developing software.

SUMMARY OF THE INVENTION

According to an embodiment, a multithreaded application is identified and a selection for an antipattern is received from a library of available antipatterns. Next, an appropriate analysis tool is determined in response to the antipattern selection. Finally, the analysis tool is processed against the multithreaded application for the antipattern for purposes of detecting coding deficiencies in the multithreaded application as defined by the antipattern.

DETAILED DESCRIPTION

Figure 1:
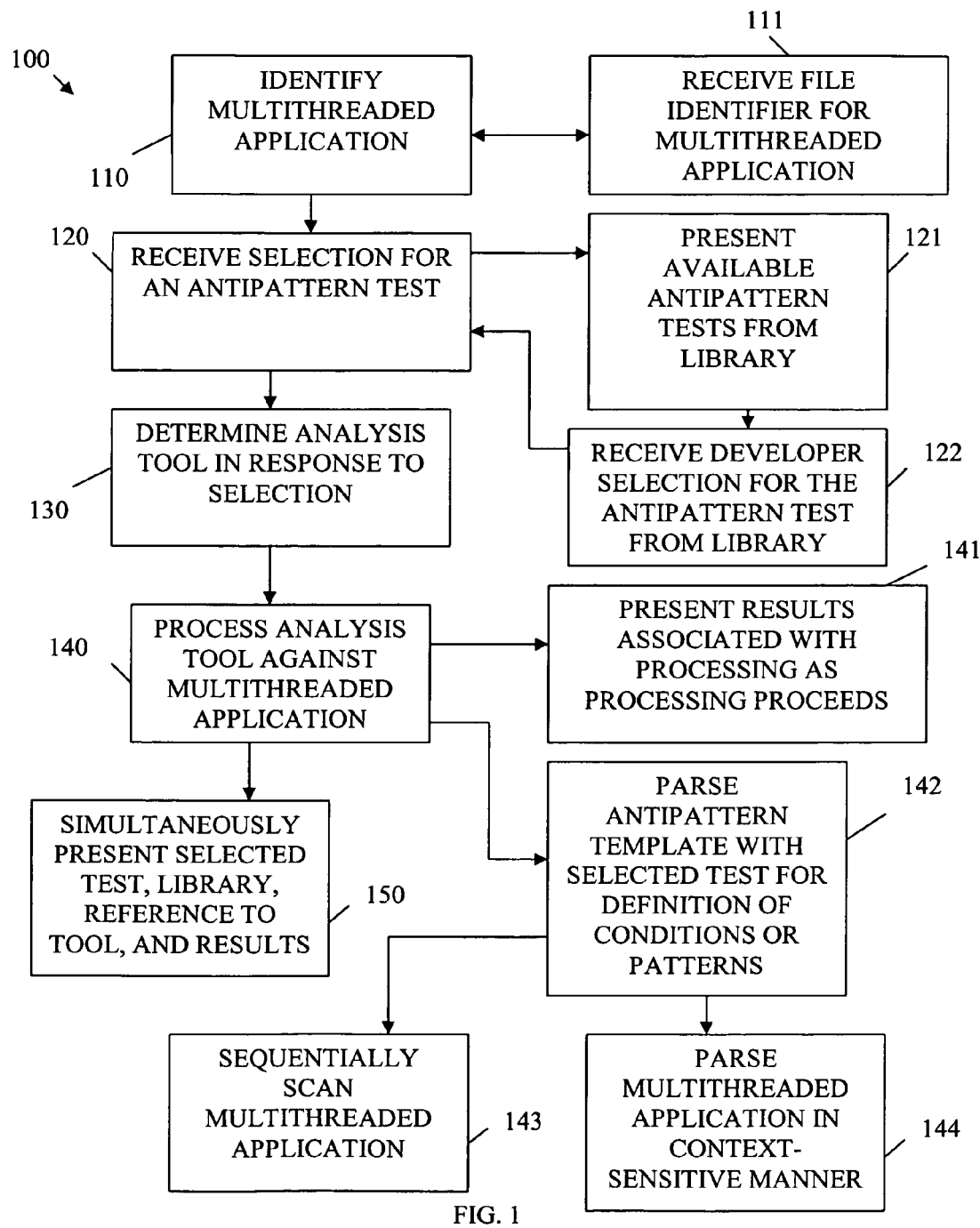
FIG. 1 is a diagram of a method for processing an antipattern test, according to an example embodiment of the invention.

As used herein "antipattern" refers to software design patterns, conditions, and/or coding statements that appear on the surface to be acceptable or reasonable, but may actually present as performance problems or as errors when included within a multithreaded application. Thus, an antipattern may refer to common software design patterns that have been proven to fail repeatedly, e.g., models of syntactic constructions (in particular) representing potential or confirmed sources of problems in a program. A design antipattern accordingly may thus present models of syntactic constructions and design options which constitute sources of erroneous behavior. The erroneous behavior may relate to processing errors or may relate to processing performance bottlenecks. Thus, the erroneous behavior may be viewed as software coding deficiencies.

An "antipattern template" is metadata about an antipattern test. An antipattern template includes, among other things, an antipattern definition. The definition includes the patterns or conditions for recognizing an antipattern. An antipattern definition may be consumed by an analysis tool. An analysis tool scans or parses a multithreaded application looking for the conditions or patterns defined by an antipattern definition. Some analysis tools are readily available such as JLint (Java Language Interpreter Tool), FindBugs (a Bug Pattern Detector Tool for Java), Flavers, and others. Other analysis tools may be custom developed for purposes of detecting antipatterns in multithreaded applications.

The term "thread" may refer to a concurrent execution sequence of a program or application. Unlike processes, threads could share common resources (memory). Accordingly, threads may execute in parallel and often share or compete for processor and memory resources. A multithreaded application is an application which can be executed as multiple threads. For example, multiple and duplicate instances of a multithreaded application may concurrently process within the same execution environment competing for or sharing memory and processor resources with one another.

The term "race" refers to a common problem that could result from the misuse of concurrency in multithreaded applications. Broadly stated, races may occur when several threads access the same resource simultaneously without proper coordination. As a result, the program might end up producing an output far different from the one desired.

The term "deadlock" refers to another common problem that could result from the misuse of concurrency in multithreaded applications. There are several definitions of a deadlock in multithreaded applications, the crux of which is that when a deadlock occurs in a program, the whole program, or part of it, is not alive anymore. A deadlock may be an impasse that occurs when multiple threads are waiting for the availability of a resource that will not become available because it is being held by another thread that is in a similar wait state.

The term "livelock" refers to another common problem that could result from the misuse of concurrency in multithreaded applications. A livelock may occur when one thread takes control (e.g., locks an object of a shared resource) and enters an endless cycle. This is usually hard to detect since it is not easy to distinguish between a long cycle and an endless cycle. More generally, livelock occurs when a thread is so busy accepting new work that it never has a chance to finish any tasks. The thread could eventually exhaust the memory and cause the program to crash. A livelock is a condition in which two or more threads continuously change their state in response to changes in the other thread(s) without doing any useful work.

The term "efficiency problem" refers to another common problem that could result from the misuse of concurrency in multithreaded applications. As much as it is needed in multithreaded programs, synchronization causes a significant overhead that usually accounts to 5-10% of the total execution time. This results from the fact that managing synchronization in Java multithreaded applications requires the Java Virtual Machine (JVM) to perform some internal tasks (e.g., writing any modified memory locations back to main memory) that could impair the efficiency of the application.

The term "static algorithm" may refer to an algorithm that is based on the analysis of code (e.g., source code or bytecode) and is normally independent of input order or thread scheduling since the code is analyzed without execution. Static analysis tools of various types, including formal analysis tools, are being developed, which can detect faults in the multi-threaded domain. Analysis tools that show a view of specific interest in the interleaving space both for coverage and performance are also being considered. Meanwhile, additional input data, such as annotations, could also be used.

The term "dynamic algorithm" may refer to an algorithm that requires the execution of a program and depends on the analysis of the resulting execution traces. While dynamic analysis usually generates fewer false warnings than static algorithms do, it often restricts error detection to faults that manifest themselves in or could be only deduced from observed traces.

FIG. 1 is a flowchart or a method 100 for processing an antipattern test, according to an example embodiment. The method 100 (hereinafter "antipattern testing service") is implemented in a machine-accessible or computer-readable format and is optionally accessible over a network. The optional network is wired, wireless, or a combination of wired and wireless.

In an embodiment, the antipattern testing service may be implemented as a graphical user interface (GUI) that provides a platform environment for analysis tools to be processed against multithreaded applications according to antipattern definitions. The platform environment may also permit visualization of the results associated with the execution of the analysis tools against the multithreaded applications.

At 110, the antipattern testing service identifies a multithreaded application for processing. The multithreaded application may be identified by the antipattern testing service in a variety of manners. For example, at 111, the antipattern testing service may receive a file identifier from a developer interacting with the antipattern testing service. This may occur when a developer using an interface associated with the antipattern testing service selects a particular multithreaded application from a directory.

In an alternative embodiment, the antipattern testing service may identify the multithreaded application when an identifier for the multithreaded application is passed as a command parameter to the antipattern testing service. An identifier for the multithreaded application may also be acquired from a configuration file or from a profile associated with a particular user. In fact, a variety of techniques may be used to identify a particular multithreaded application for processing. All such techniques are intended to fall within the scope of the embodiments presented herein.

At 120, the antipattern testing service receives a selection for a particular antipattern test. Again, the selection may be received in a variety of manners. One way to receive the selection is through a list of available antipattern tests.

For example, at 121, consider a library of antipattern tests where the available antipattern tests are presented within a GUI to a developer to view and select. Each test may be viewed as metadata representing an antipattern template. At 122, a developer may select a desired antipattern test from the list of available antipattern tests available in the library. The library aims to produce clear documentation of identified software design deficiency, and in particular of antipatterns associated with multithreading in a multithreaded application. It would be appreciated that this library may be expanded as new antipatterns related to programming styles are identified and defined.

Various methods may be used to identify existing antipatterns for purposes of populating the library. Problems most commonly considered in the literature and by authors of several analysis tools, maybe reviewed. Existing classifications in the research literature may also be reviewed, as well as practical programming guidebooks and the existing tools that target program analysis problems. The problems, errors, and programming styles forming antipatterns may be identified and documented to make it easier for developers and users of analysis toolsets to understand the problems, detect them, and correct the code that suffers from their existence.

A classification system for classifying all identified antipatterns to be included in the library may be developed. Although various classification systems exist, many are too abstract or vague to help developers and programmers when analyzing multithreaded applications on a level of written code. Other classification systems originated from an understanding of the analyzed application which takes into account the functional aspects of the system being tested and not the correctness and quality of the written code. A classification system that would assist programmers in identifying antipatterns is therefore provided, in an embodiment. This classification system classifies problems of multithreaded applications according to the following main classification groups:

Correctness problems. Problems that affect the outcome of the program. Either the program produces a wrong output (data and memory corruption) or it does not produce any output at all due to deadlocks, livelocks, race conditions, or memory exhaustion.

Efficiency and quality problems. These problems affect mainly the performance of the program, so the desired output could still be produced but not in the desired time. Also, the problem could be that the program is not easily usable or maintainable.

These two main groups of classes have further been divided into lower levels thereby to further simplify the task of the developer who needs to detect and solve software design problems. The following lower classes of multithreaded related antipatterns are defined:
1. Deadlocks
2. Livelocks
3. Race Conditions
4. Efficiency Problems
5. Quality and Style Problems.
6. Problems Leading to Unpredictable Consequences.

It should be noted that the last category groups the antipatterns that are known to occur in multithreaded applications, but whose outcome is not directly identified in the behavior of the application.

As there are antipatterns that result in problems in more than one aspect of the program behavior, the antipatterns are archived in the library in the category that is known to have the most serious consequences on the analyzed program.

The template used to define each antipattern for the library provides information about a particular antipattern test, and includes, for example:
The definition (name, description, and category),
An example of occurrence (code samples),
The re-factoring solution (hints and tips),
Possible conflicts of applying the proposed solutions,
The possible detection technique(s), and
Comments (e.g., source of the antipattern).

An example of an antipattern template for an antipattern test is provided below:
Identification A concise definition of the problem.
Description The situations in which this problem could appear. The effects it has on the code and the application.
Category Deadlock, Livelock, Race Condition, Efficiency, Quality and Style Problem, . . .
Example If available, sample code where the problem is illustrated.
Re-Factoring How to solve the problem once detected in the program.
Conflict Sometimes solving one problem of a certain class can cause another problem of a different class. For example, Blob threads and over synchronization.
Comments If available, the source of this pattern. Any comments that could be helpful in the detection or re-factoring.
Detection/Definition How to detect the problem in source code. A high level description of the proposed algorithm to be used in the detection process.

The template includes a variety of useful information that may be extracted, presented, and consumed by the antipattern testing service and communicated to analysis tools. For example, the template "Name" may be presented by the antipattern testing service within a GUI window to a developer for selection, when the developer highlights or puts selection focus over a particular Name then the template's description may be presented. This assists the developer in determining whether to select or not to select a particular template/test.

A listing of some example antipattern templates/tests is provided below at the end of the discussion for FIG. 1. The listing is presented for purposes of illustration only and is not intended to limit the teachings presented herein to any specific template or test, since it is apparent that the format of the template may be used to define any category or type of antipattern known or hereafter developed.

Once a multithreaded application is identified for processing and a particular antipattern test selected, the antipattern testing service, at 130, determines which analysis tool to process in order to perform the test against the multithreaded application. Some analysis tools are better equipped to perform tests or detect certain patterns or conditions than other analysis tools.

The antipattern test itself may directly or indirectly identify the preferred analysis tool for processing a particular test. For example, in the example antipattern template presented above, the detection/definition field may specifically identify an analysis tool by reference or link (e.g., such as JLint, FindBugs, Flavers, or any customized analysis tool). Alternatively, the category field of the template may be used to access another table to obtain a mapping for identifying a particular analysis tool for processing.

In some embodiments, the antipattern testing service may permit a developer to override a determined analysis tool with a different developer-defined analysis tool. In the same vein, the antipattern testing service may interactively ask the developer to select an analysis tool for processing against the multithreaded application from a list of available analysis tools that are defined as capable of being processed for a selected antipattern test. Thus, it should be noted that for some antipattern tests there may be a plurality of available analysis tools that could be processed against the multithreaded application.

At 140, the antipattern testing service processes the resolved analysis tool against the multithreaded application for the selected antipattern test. According to an embodiment, at 141, the antipattern testing service dynamically presents the results associated with the analysis tool's processing as the processing occurs or proceeds. This may entail displaying source code line numbers and text associated with source code from the multithreaded application along with messages from the analysis tool. In this manner, the antipattern testing service may permit dynamic visualization of the results associated with the execution of the analysis tool. Of course in other embodiments the antipattern testing service may also pipe or store the results of the processing analysis tool in a file for subsequent viewing and analysis.

In an embodiment, at 142, the antipattern testing service may parse an antipattern template for a selected test to acquire a definition of conditions or patterns that define the antipattern test. These conditions or patterns are then supplied to the analysis tool in a recognized format, which the analysis tool uses to scan or parse the multithreaded application for purposes of detecting the conditions or patterns. In one situation, at 143, the analysis tool may serially scan the source code of the multithreaded application for the conditions or patterns defined by the antipattern test. In another more complex situation, at 144, the analysis tool may parse the source code of the multithreaded application in a context-sensitive or state-driven manner to detect the conditions or patterns defined by the antipattern test.

In still more embodiments, the antipattern testing service may provide a visualization platform and interface for a developer. For example, at 150, the antipattern testing service may present a GUI to a developer having a series of windows where each window simultaneously presents different information to the developer, such as the name of the selected antipattern test, the antipattern library, a reference or identifier to the executing analysis tool, and the dynamic results being produced by the analysis tool. This facilitates improved comprehension on the part of the developer for the relevant information being processed and increases developer ease of use of the antipattern testing service.

It has now been demonstrated how antipatterns may be encapsulated as templates within a library and utilized in an automated fashion with analysis tools to detect antipatterns in multithreaded applications. The technique is achieved through the processing of the antipattern testing service. Some thirty-seven example instances of the antipattern template are now presented. It is understood that other formats for templates and other instances of those templates may be developed and used without departing from the teachings presented herein.

Antipattern Template Example #1—Synchronized Method Call in Cycle of Lock Graph

| | |
|---|---|
| Name | Synchronized method call in cycle of lock graph |
| Description | The lock dependency graph is a graph whose nodes are classes and arcs are the lock acquisitions between the classes. When a synchronized method appears in a cycle of the lock dependency graph, it could indicate that calling this method could lead to a deadlock in the application. |
| Category | Deadlock |
| Example | Public class A<br>{ Object b = new B( );<br>    Public synchronized void foo ( )<br>    { b.bar( ) }<br>    }<br>}<br>public class B<br>{ Object b = new A( );<br>    Public synchronized void bar ( )<br>    { a.foo( ) }<br>    }<br>}<br>Class MyThread implements Runnable {<br>Run( )<br>{...<br>a.foo( );<br>...<br>}<br>} |
| Detection/<br>Definition | 1. Compute the lock graph<br>2. Detect cycles in the lock graph<br>3. Identify synchronized methods that make part of the cycles<br>Detectable by JLint. |
| Re-Factoring | Solution: Proper reordering of lock acquisition among the threads involved in the deadlock.<br>Conflicts: Reordering the lock acquisition might lead to data races. |
| Comments | The detection results highly depend on the expressiveness of the computed lock graph. Moreover, the presence of a cycle in the lock graph is a necessary condition for deadlock, but not a sufficient one. Therefore, there is high risk of numerous false positives. |

Antipattern Template Example #2—Method Call Leads to a Cycle in Lock Graph.

| | |
|---|---|
| Name | Method call leads to a cycle in lock graph |
| Description | When a cycle in the lock dependency graph is reachable from a method call directly or through a chain in the call graph, the cycle could lead to a deadlock. This antipattern is the result of bad synchronization between threads of an application. |
| Category | Deadlock. |
| Example | Public class A<br>{ Object b = new B( );<br>    Public synchronized void foo ( )<br>    { b.bar( ); }<br>    }<br>}<br>public class B<br>{ Object b = new A( );<br>    Public synchronized void bar ( )<br>    { a.foo( ); }<br>    }<br>} |

| | |
|---|---|
| | Class MyThread implements Runnable {<br>run( )<br>{...<br>method( );<br>...<br>}<br>}<br>... method( ){ ... a.foo( );...} |
| Detection | 1. Compute the lock graph<br>2. Compute the call graph<br>For each cycle in the lock graph, detect method calls that lead to the cycle. |
| Re-Factoring | Solution: Proper reordering of lock acquisition among threads involved in the deadlock.<br>Conflicts: Reordering the lock acquisition might lead to data races. |
| Comments | The detection results highly depend on the expressiveness of the computed lock graph. Moreover, the presence of a cycle in the lock graph is a necessary condition for deadlock, but not a sufficient one. Therefore, there is high risk of numerous false positives.<br>Note: This antipattern can be seen as an extension of the "Synchronized method call in cycle of lock graph" antipattern. |

Antipattern Template Example #3—Cross Synchronization.

| | |
|---|---|
| Name | Cross synchronization |
| Description | One thread nests its synchronization blocks in an order contrary to that of another thread vying for the same monitors, a deadlock can result.<br>Each thread is stuck at the point indicated by the deadlock comment and is waiting for the release of the monitor that the other one already has. |
| Category | Deadlock. |
| Example | HashSet first = new HashSet( );<br>HashSet second = new HashSet( );<br>    public void add(Object in) {<br>        synchronized (first) {<br>            synchronized (second) {<br>                first.add(in);<br>                second.add(out);<br>            }<br>        }<br>    }<br>    public void remove(Object out) {<br>        synchronized (second) {<br>           synchronized (first) {<br>                first.remove(in);<br>                second.remove(out);<br>           }<br>        }<br>    } |
| Detection | 1. Compute the lock dependency graph.<br>2. Detect the cycles in the lock dependency graph.<br>3. Identify the corresponding synchronized blocks.<br>Detectable by JLint. |
| Re-Factoring | Solution: Proper reordering of lock acquisition among the threads involved in the deadlock.<br>Conflicts: Reordering the lock acquisition might lead to data races. |
| Comments | It may involve more than two threads and two synchronized objects. |

Antipattern Template Example #4—Overriding a Synchronized Method

| | |
|---|---|
| Name | Overriding a synchronized method. |
| Description | In a class hierarchy, when a method in a subclass has the same name and type signature as a method in its super class, the method in the subclass is said to override method in the super class. When an overridden method |

-continued

| | |
|---|---|
| | is called from within a subclass, it will always refer to the version of that method defined by the subclass. So, if the overridden method is synchronized and the overriding one is not, the method will be referred to as non synchronized. |
| Category | Race condition. |
| Example | Class MyThread implements Runnable {<br>    Ressource r ;<br>    public MyThread(Ressource __r) {<br>        this.r = __r ;<br>    }<br>    run( ) {<br>      r.process( ) ;<br>    }<br>}<br>class Ressource {<br>    ...<br>    synchronized void process( ) {<br>        ...<br>    }<br>}<br>class SpecRessource {<br>    void process( ) {<br>        ...<br>    }<br>} |
| Detection | 1. Compute the inheritance class<br>2. Collect the base methods and their overriding ones<br>3. Identify the synchronized base methods whose overriding ones are not.<br>Detectable by Jlint |
| Re-Factoring | Solution: Make method synchronized.<br>Conflicts: None |
| Comments | Not necessarily a bug. So it can be presented as a warning. |

Antipattern Template Example #5—Non Synchronized Method Called by More than One Thread.

| | |
|---|---|
| Name | Non synchronized method called by more than one thread |
| Description | It is not safe when a non synchronized method could be called by more than one thread. |
| Category | Race condition. |
| Example | ...<br>public void nonSyncmethod( )<br>{<br>    ... }<br>...<br>class Thread1Calling__NonSync__Method extends Thread{<br>public void run( ) {<br>this.obj.nonSyncmethod( ); }<br>}<br>class Thread2Calling__NonSync__Method extends Thread{<br>public void run( ) {<br>this.obj.nonSyncmethod( );}<br>} |
| Detection | 1. For each thread, collect the methods called inside the run( ) method.<br>2. Extract the methods that could be called by more then one thread.<br>3. Identify the non-synchronized methods.<br>Detectable by Jlint. |
| Re-Factoring | Solution: Declare the method synchronized<br>Conflicts: Possibility of oversynchronization |
| Comments | This pattern can be detected dynamically also by either of the following algorithms implemented within Jprobe:<br>1. Happens Before: It seeks to prove that one thread's access to a variable must happen before another thread can access the same variable. If the analyzer cannot prove a "happens-before" relationship, the threads are deemed to be concurrent, meaning that they may require access to the same data at the same time, and JProbe Threadalyzer reports a data race.<br>2. Lock Covers: It watches all access to shared variables, and tracks the lock cover-the set of locks held by all threads that ever need access to a shared variable. When the lock cover becomes empty, the variable is deemed to be unprotected and Jprobe Threadalyzer reports the condition as a data race. |

Antipattern Template Example #6—Non Volatile Field Used by More than one Thread.

| | |
|---|---|
| Name | Non volatile field used by more than one thread. |
| Description | Normally, it is not safe to use non volatile variables as shared fields, unless they are synchronized.<br>The Java programming language allows threads that access shared variables to keep private working copies of the variables; this allows a more efficient implementation of multiple threads. But could be source of inconsistency with the master copies in the shared main memory.<br>With volatile modifier, at each update of a variable, Java reflects the changes in the main memory. |
| Category | Race condition. |
| Example | |
| Detection | 1. Collect the attributes used by each thread.<br>2. Detect the non volatile attributes that are shared.<br>Detectable by Jlint. |
| Re-Factoring | Solution: Make the attribute volatile.<br>Conflicts: If volatile fields are accessed frequently inside methods, their use is likely to lead to slower performance than would locking the entire methods. The use of volatile variable is often considered unsafe and could result in data races. |
| Comments | |

Antipattern Template Example #7—Non Synchronized Run( ) Method

| | |
|---|---|
| Name | Non synchronized run( ) method |
| Description | When different threads are started for the same object that implements the Runnable interface, the method run( ) must be synchronized. |
| Category | Race condition. |
| Example | Class MyThread implements runnable{<br>    ...<br>    public void run( ) {...}<br>}<br>...<br>MyThread t1 = new MyThread( ) ;<br>New Thread(t1).start( ) ;<br>New Thread(t1).start( ) ; |
| Detection | Detect the creation of Java threads (Thread Class) with the same Runnable object, an instance of a class that implements the Runnable interface.<br>Data flow analysis could be used to determine which threads are created with the same Runnable instance.<br>Detectable by Jlint. |
| Re-Factoring | Solution: Make the run( ) method synchronized.<br>Conflicts: Oversynchronization. |
| Comments | |

Antipattern Template Example #8—Overuse of Synchronized Methods.

| | |
|---|---|
| Name | Overuse of synchronized methods |
| Description | Methods of a class that is used by only one thread should not be synchronized. Otherwise, it could have a negative impact on the efficiency of the application. Synchronized methods take longer to execute than |

| | -continued |
|---|---|
| | unsynchronized methods and limit the multitasking present in the JVM and operating system. |
| Category | Efficiency problem. |
| Example | |
| Detection | 1. Collect methods that are called in each thread. |
| | 2. Detect synchronized methods that are called by only one thread. |
| Re-Factoring | Solution: Declare the methods non-synchronized |
| | Conflicts: If not properly handled, the solution could lead to methods being declared non-synchronized while they should be. |
| Comments | In some cases, performance improvements are achieved by writing synchronized and non-synchronized versions of the same method, and invoking the synchronized method only when needed. |

Antipattern Template Example #9—Method Wait( ) Invoked with Another Object Locked.

| Name | Method wait( ) invoked with another object locked |
|---|---|
| Description | This antipattern appears when one thread invokes the wait( ) method while it is locking other objects. When the wait( ) method is invoked, more than one monitor objects are locked by the thread. Since wait( ) unlocks only one monitor, it can be a source of deadlock. |
| Category | Deadlock. |
| Example | Class Resource { <br> ... <br>    synchronized process( ) { <br>      ... <br>      while( ) { <br>        ... <br>        wait( );    } <br>    } <br> } <br> Thread: <br> ... <br> Resource res ; <br> ... <br> run( ) { <br>    Synchronized(A) <br>    { <br>      ... <br>      res.process( ) ; <br>    } <br> } |
| Detection | 1. Detect the wait( ) occurrences in the code of a thread |
| | 2. Check the monitors held by the thread at the time Detectable by Jlint |
| Re-Factoring | Solution: When wait( ) is invoked in a thread make sure that no more than one lock is withheld Conflicts: Improper handling of the locks could lead to data races and corruption. |
| Comments | A variation of this antipattern is also cited in the literature. Lock and I/O wait: it occurs when a thread enters a monitor and then waits on a blocking input/output operation. If the blocking I/O operation never occurs, any thread requiring the held monitor blocks indefinitely, causing a deadlock. |

Antipattern Template Example #10—Call Sequence to Method Potentially Causing Deadlock in Wait( ).

| Name | Call sequence can cause deadlock in wait( ). |
|---|---|
| Description | The problem appears when a sequence of method calls, which lock at least two object monitors, terminates by calling the method wait( ). Since wait( ) unlocks only one monitor and suspends the thread in which the call was made, this can cause deadlock. |

| | -continued |
|---|---|
| Category | Deadlock. |
| Example | |
| Detection | 1. Compute the call graph |
| | 2. Analyze the method invocations in the graph. |
| | 3. Collect the locked objects until the wait( ) method call is reached. |
| | Detectable by Jlint |
| Re-Factoring | Solution: When wait( ) is invoked in a thread make sure that no more than one lock is withheld Conflicts: Improper handling of the locks could lead to data races and corruption. |
| Comments | Similar to: Method wait( ) invoked with monitor of other object lock, the difference is in detecting the sequence of method calls. |

Antipattern Template Example #11—Identifier.wait( ) Method Called without Synchronizing on Identifier.

| Name | Identifier.wait( ) method called without synchronizing on identifier. |
|---|---|
| Description | One of the constraints in Java is that an identifier.wait( ) (or identifier.notify( )) can only be invoked by a thread currently holding the monitor lock for identifier. When a thread violates this constraint, the thread will be permanently blocked (i.e. deadlocked). |
| Category | Quality and style problem. Deadlock. |
| Example | |
| Detection | Use points-to analysis, data and control flow analysis, call graph. Detectable by Jlint |
| Re-Factoring | Solution: The thread should get a lock on the object (referenced by identifier) before calling wait( ), i.e., the wait ( ) method should only be invoked from inside a synchronized(identifier) block.. Conflict: None. |
| Comments | The thread could get the monitor in another method that calls the method with the wait( ) invocation. |

Antipattern Template Example #12—Synchronized Read Only Methods.

| Name | Synchronized read only methods |
|---|---|
| Description | Methods that perform just read access on an object (while there are no methods that have a write access) need not be synchronized. They simply add to the overhead of synchronization. It is useful to know how many such cases exist in an application. This serves as an indicator of the level of needed synchronization. |
| Category | Efficiency problem. |
| Example | |
| Detection | Use control and data flow analysis. |
| Re-Factoring | Solution: Remove synchronization from read only methods. Conflicts: Risk of data races, especially when the fields in the methods are shared among several threads. |
| Comments | |

Antipattern Template Example #13—Internal Call of a Method.

| Name | Internal call of a method. |
|---|---|
| Description | Java allows reentrant monitors. One thread can get the monitor (lock) several times in a nested way. Aside from the first acquisition of the lock, synchronization is not necessary. |

-continued

| | |
|---|---|
| Category | Efficiency problem. |
| Example | Class Reetrant { |
| |     Synchronized void foo( ) { |
| |         This.bar( ) ; |
| |     } |
| |     ... |
| |     synchronized void bar( ) { |
| |     } |
| | } |
| Detection | Use call graph and data flow analysis. |
| Re-Factoring | Potential Solutions: |
| | 1. Remove synchronization from the method using the inner lock (bar( ) in the example). |
| | 2. Remove the code from bar( ) method into the calling method. |
| | Conflict: Risk of data races or corruption, especially if other threads call the method. |
| Comments | |

Antipattern Template Example #14—Object Locked but not Used.

| | |
|---|---|
| Name | Object locked but not used |
| Description | This antipattern is exhibited when a thread gets a monitor on an object and does not use it. |
| Category | Efficiency problem. |
| | Quality and style problem. |
| Example | |
| Detection | In each synchronized block, detect if the synchronized object is used in this lock by checking all the statements of the block. |
| Re-Factoring | Solution: Rewrite the synchronized block |
| | Conflicts: Care should be taken not to leave any shared objects unsynchronized. |
| Comments | Limitation: not detected if the object is not represented by an explicit reference as in the following example: synchronized(obj.field) {...} |

Antipattern Template Example #15—Synchronization Abuse.

| | |
|---|---|
| Name | Synchronization abuse |
| Description | Do not synchronize an entire method if the method contains significant operations that do not need synchronization. To maximize concurrency in a program, try to minimize the frequency and duration of local acquisition. Sometimes, only a few operations within a method may require synchronization. |
| Category | Efficiency problem.. |
| | Quality and style problem. |
| Example | Synchronized void f( ) { |
| |     statement1 ; |
| |     statement2 ; |
| |     statement3 ;     // synchronization not needed. |
| | } |
| Detection | Use data flow analysis to detect code that does not require synchronization. |
| Re-Factoring | Solution: Use of synchronization on a part of the method. |
| | Re-factoring the example: |
| | Void f( ) { |
| |   Synchronized(this) { |
| |     Statement1; |
| |     Statement2 ; |
| |   } |
| |   statement3 ; |
| | } |
| | Conflicts: Risk of leaving pieces of code unprotected. |

-continued

| | |
|---|---|
| Comments | It might not be straightforward to detect parts of code that do not require synchronization. |
| | Synchronized blocks are often slightly more expensive than synchronized methods (especially in lock-release). |

Antipattern Template Example #16—Wait( ) not in Loop.

| | |
|---|---|
| Name | wait( ) is not in loop |
| Description | While it is possible to correctly use wait( ) without a loop, such uses are rare and worth examining, particularly in code written by developers without substantial training and experience writing multithreaded code. |
| Category | Quality and style problem. |
| Example | if (! resource.isAvailable) { |
| |     wait( ) ; |
| | } |
| | When the thread wakes up, it is better to check again the condition. |
| Detection | Check if the wait( ) method invocation is in a loop. |
| | Detectable by FindBugs. |
| Re-Factoring | Solution: Use while instead of if |
| | Conflicts: None |
| Comments | |

Antipattern Template Example #17—Unconditional Wait( ).

| | |
|---|---|
| Name | Unconditional wait( ) |
| Description | This could be seen as a strange way to implement a wait. When waiting on a monitor, it is good practice to check the condition being waited for before entering the wait( ). Without this check, the possibility that the event notification has already occurred is not excluded, and the thread may wait forever. |
| Category | Deadlock. |
| Example | ... |
| | synchronized(o) { |
| |     System.out.println ("waiting...") ; |
| |     wait( ) ; |
| | } |
| Detection | In each synchronized block, check if the wait( ) method call is in a conditional structure. |
| | Detectable by FindBugs |
| Re-Factoring | Solution: always use wait( ) within a conditional structure. |
| | A better version of the example |
| | if (! o.isAvailable( )) { |
| |     System.out.println ("Not available") ; |
| |     synchronized(o) { |
| |         System.out.println ("waiting...") ; |
| |         wait( ) ; |
| |     } |
| | } |
| | Conflicts: None |
| Comments | Similar to: wait( ) not in loop |

Antipattern Template Example #18—Unconditional Notify( ) or NotifyAll( ).

| | |
|---|---|
| Name | Unconditional notify( ) or notifyAll( ) |
| Description | This could be seen as the dual of unconditional wait( )pattern. In general, because some conditions become true, the notify( ) and notifyAll( ) methods are called. |

-continued

| | |
|---|---|
| Category | Deadlock. |
| | Problem with unpredictable consequences. |
| Example | |
| Detection | Check for each synchronized block, if notify( ) (or notifyAll( )) is called within a conditional structure. Detectable by FindBugs |
| Re-Factoring | Solution: Always make sure that notify( ) and notifyAll( ) are called from within conditional structures. |
| | Conflicts: None. |
| Comments | |

Antipattern Template Example #19—Reference Value is Changed when It is Used in Synchronization Block.

| | |
|---|---|
| Name | Reference value is changed when it is used in synchronization block. |
| Description | This can be seen as a programming error. |
| Category | Quality and style problem. |
| | Deadlock. |
| Example | Synchronized(ref) |
| | { |
| | ... |
| | ref = new Object( ) ; |
| | ... |
| | } |
| Detection | Detect the instructions that change the reference in a synchronized block. |
| | Detectable by Jlint. |
| Re-Factoring | Not available. |
| Comments | |

Antipattern Template Example #20—Overthreading.

| | |
|---|---|
| Name | Overthreading |
| Description | It is exhibited when a "large" number of threads are defined and created. |
| Category | Efficiency problem. |
| | Quality and style problem. |
| Example | |
| Detection | Use some indicators, defined statically or dynamically such as: |
| | No or few objects are shared by threads |
| | No use of any inter-thread synchronization: wait, notify |
| | Size of threads (Lines of code-LOC-metric) |
| | Thread execution is sequential |
| Re-Factoring | Solution: Use threading only as needed. |
| | Conflict: Risk of ending with blob threads. |
| Comments | |

Antipattern Template Example #21—Blob Thread.

| | |
|---|---|
| Name | Blob thread |
| | AKA, God thread |
| Description | A thread that takes the whole or a large part of the activity of the system. |
| Category | Quality and style problem. |
| Example | |
| Detection | Use dynamic and static analysis to collect indicators of: |
| | Inter thread activities (sharing objects, wait and notify methods) |
| | Size of the thread (LOC metric). |
| | Activity of each thread. |
| Re-Factoring | Solution: Distribute program activities among threads |
| | Conflict: Overthreading |
| Comments | |

Antipattern Template Example #22—Complex Computation within an AWI/Swing Thread.

| | |
|---|---|
| Name | Complex computation within an AWI/Swing thread |
| Description | The listeners in a Java's Abstract Windows Interface (AWI) thread are |
| | too long (temporary irresponsive interface), never end, e.g., due to a cycle with a continuous true condition (irresponsiveness) share many objects with the main thread (may affect responsiveness) |
| Category | Efficiency problem. |
| Example | see Allen Holub "Taming Java Threads" [Ho100]: Listing 1.1 |
| Detection | 1. For the AWT thread, check the complexity of the listener method (method names which contain word listen). |
| | 2. List all the overcomplicated listeners of AWI thread Syntactically, the complexity could be estimated with a metric on the size and number of loops. |
| Re-Factoring | Solution: |
| | Create additional threads to perform any non-trivial operations. |
| | Provide the user with a message that a certain operation is in process and with the "Cancel" button. |
| | Conflicts: Possibility of over threading. |
| Comments | The pattern is important since it is relevant to all non-console applications, and interface is the only justified place for threads in a program of a beginner. |

Antipattern Template Example #23—Misuse of Notify-All( ).

| | |
|---|---|
| Name | Misuse of notifyAll( ) |
| Description | The notify( ) method is more efficient than the notifyAll( ) method, especially when not too many objects are shared between threads. |
| Category | Efficiency problem. |
| Example | |
| Detection | 1. Collect all objects used in each thread. |
| | 2. Search for objects that are used by only two threads. |
| Re-Factoring | Solution: Replace notifyAll( ) by notify( ) |
| | Conflicts: Since notify( ) activates one thread only (randomly) this fix could lead to more overhead and possibly a deadlock. |
| Comments | Generally, the use of notifyAll( ) is more safe for multithreaded programming. |
| | When notifyAll( ) is called, all threads waiting for the same object-lock, will receive a signal but just one gets the lock. Therefore, when there are only two threads operating on this object, the use of notifyAll( ) is not needed. |

Antipattern Template Example #24—The Double-Check Locking for Synchronized Initialization.

| | |
|---|---|
| Name | The double-check locking for synchronized initialization |
| Description | Double-check locking is widely cited and used as an efficient method for implementing lazy initialization in a multithreaded environment and as an efficient way to reduce synchronization overhead. Unfortunately, it will not work reliably in a platform independent way when implemented in Java, namely due to the current Java Memory Model (JMM). |
| Category | Race condition. |
| Example | //Load and initialize our instance |
| | //if necessary |
| | if (instance == null) |
| | { |
| | synchronized (this) |
| | { if (instance == null) |
| | ... create the instance ... |

-continued

| | |
|---|---|
| Detection | For basic instances of the antipattern, like the one illustrated in the example, detect code segments that match exactly the listing. Detectable by FindBugs. |
| Re-Factoring | Solution: Two possible fixes<br>1. Use a temporary variable to try and force the constructor to execute before its reference is assigned.<br>2. Use a "guard" variable to indicate that the initialization has completed<br>Conflicts: Unexpected behavior, as there is no guarantee the compiler or the JVM will follow the ordering from the source code. |
| Comments | The Java Language Specification (JLS) gives Java compilers and JVMs a good deal of latitude to reorder or optimize away operations. Java compilers are only required to maintain within-thread as-if-serial semantics, which means that the executing thread must not be able to detect any of these optimizations or reorderings. However, the JLS makes it clear that in the absence of synchronization, other threads might perceive memory updates in an order that "may be surprising." |

Antipattern Template Example #25—Synchronized Atomic Operations.

| | |
|---|---|
| Name | Synchronized atomic operations |
| Description | An atomic operation is one that cannot be interrupted by the thread scheduler-if the operation begins, it will run to completion before the possibility of a context switch, it is the case of primitive type variables except double and long types. Get( ) and Set( ) methods could be used without synchronization when considered as atomic. This antipattern is highly disputed. |
| Category | Efficiency problem. |
| Example | |
| Detection | Detect in the code all the atomic operations inside synchronized blocks or methods. |
| Re-Factoring | Solution: Do not synchronize atomic operations.<br>Conflicts: Have to be careful about what statements are really atomic. Data incoherence: without synchronization the values assigned by one thread are not visible by other threads. |
| Comments | Some would argue that atomic operations still need synchronization. |

Antipattern Template Example #26—Synchronized Immutable Object.

| | |
|---|---|
| Name | Synchronized immutable object |
| Description | An immutable object is one whose state does not change after it is created (fields are final). Multiple threads can safely access the object simultaneously, so no synchronization is required. |
| Category | Efficiency problem. |
| Example | |
| Detection | For every reference used as a synchronized object in a synchronized block, check if the reference is declared final. |
| Re-Factoring | Solution:<br>Remove synchronization from pieces of code handling immutable objects.<br>Conflicts: None. |
| Comments | When the synchronization is not defined by synchronized block (synchronized methods are used instead), deeper analysis should be performed: All instances of the class (with synchronized methods) must be used with final fields.<br>Points-to analysis can improve results, when a final field is referenced by another variable. |

Antipattern Template Example #27—Unnecessary Notification.

| | |
|---|---|
| Name | Unnecessary notification |
| Description | Notification issued when no thread is waiting. |
| Category | Efficiency problem.<br>Quality and style problem. |
| Example | |
| Detection | For each thread that may call notify( ) or notifyAll( ) methods, check if another thread could call wait( ) method on the same object. |
| Re-Factoring | Solution: Remove notification operations when no threads are waiting.<br>Conflicts: Some threads might end up waiting forever. |
| Comments | |

Antipattern Template Example #28—Double Call of the Start Method of a Thread.

| | |
|---|---|
| Name | Double call of the start( ) method of a thread |
| Description | The start( ) method call is not supposed to be used more than once for the same thread. |
| Category | Problem with unpredictable consequences. |
| Example | ...<br>t = new Thread(runnable) ;<br>t.start( ) ;<br>...<br>t.start( ) ; |
| Detection | For each creation of an instance of a thread (Thread Class), check if there are more than one call to start( ) method.<br>Sometimes, the detection of the second invocation needs data flow analysis or a points-to analysis. |
| Re-Factoring | Solution: Remove the additional unneeded start( ).<br>Conflicts: None. |
| Comments | The second invocation of the start( ) method, could be far from the first one, possibly in another method, or "via" an alias; therefore, making detection quite complex:<br>t = new thread( ) ;<br>t.start( ) ;<br>...<br>tt = t ;<br>...<br>tt.start( ) ; |

Antipattern Template Example #29—Waiting Forever.

| | |
|---|---|
| Name | Waiting forever |
| Description | Thread executes the wait( ) for the lock of an object but is never notified and thus never resumes its execution. It could be considered as a programming error. |
| Category | Deadlock. |
| Example | |
| Detection | For each thread that could call the wait( ) method, check if there is at least, one thread that may call notify( ) or notifyAll( ) methods for the same object. |
| Re-Factoring | Solution: Make sure all instances of wait( ) are notified.<br>Conflicts: Risk of excessive unnecessary notification. |
| Comments | A variation of this antipattern may appear as the Wait Stall antipattern |

Antipattern Template Example #30—Unsynchronized Spin-Wait.

| | |
|---|---|
| Name | Unsynchronized spin-wait<br>AKA: Spin-wait |

-continued

| | |
|---|---|
| Description | It appears in the form of an unsynchronized loop, whose exit condition is controlled by another thread. Resulting problems include exhaustive use of resources (CPU time) and thread stalls. |
| Category | Efficiency problem. Livelock |
| Example | //wait for spider to finish<br>while (spider.isAlive( ))<br>{<br>    //do nothing, just test again<br>} |
| Detection | For the basic instances of the pattern, as illustrated in the example:<br>Detect in the code all occurrences of empty loops with attributes as condition variables.<br>Detectable by FindBugs. |
| Re-Factoring | Solution: (For simple cases as in the example) Use yield or sleep to take control from the current thread. This will provide other threads (especially lower priority ones) with a chance to execute while the condition is not yet fulfilled.<br>Conflicts: Improper use of synchronization facilities could lead to deadlocks or data races. |
| Comments | In general, this is hard to detect this antipattern. |

Antipattern Template Example #31—Start( ) Method Call in Constructor.

| | |
|---|---|
| Name | Start( ) method call in constructor |
| Description | start( ) method call in constructor of a class that implements Runnable.<br>In the case where this class is specialized (defining a subclass), the thread is launched (invocation of the start ( )) before the end of the instance creation of the subclass, because the constructor of the super class is executed before the one of the current class.<br>The program can have an unexpected behavior. |
| Category | Problem with unpredictable consequences. |
| Example | |
| Detection | Detectable by FindBugs |
| Re-Factoring | Solution: Rewrite the constructor method and avoid calling start( ) in it, or declare the class final.<br>Conflicts: None. |
| Comments | Similar to: Double call of the start method of a thread. |

Antipattern Template Example #32—Get-Set Methods with Different Declarations.

| | |
|---|---|
| Name | Get-Set methods with different declarations |
| Description | This antipattern occurs when the get method of an object is unsynchronized while the set method is synchronized. |
| Category | Race condition. |
| Example | |
| Detection | Detectable by FindBugs |
| Re-Factoring | Solution: Declare both methods synchronized.<br>Conflicts: Possibility of over synchronization. |
| Comments | |

Antipattern Template Example #33—Improper Method Calls.

| | |
|---|---|
| Name | Improper method calls |
| Description | This antipattern occurs when improper method calls are made in the methods of a thread. A method call can be improper if:<br>The call itself is not correct (Thread.run( )).<br>The called method has bugs.<br>The method is deprecated. |
| Category | Problem with unpredictable consequences. |
| Example | |
| Detection | Detectable by FindBugs |
| Re-Factoring | Solution: Rewrite the method in which the improper call is made.<br>Conflicts: None. |
| Comments | |

Antipattern Template Example #34—Wait Stall.

| | |
|---|---|
| Name | Wait stall |
| Description | A wait stall can occur when a thread calls a wait( ) method with no timeout specified. |
| Category | Livelock.<br>Deadlock. |
| Example | |
| Detection | Detectable dynamically by Jprobe Threadalyzer.<br>The Jprobe Threadalyzer sets a priori a threshold for blocked threads.<br>If the wait( ) method does not complete before the threshold is reached, then the stall will be reported as a wait stall. |
| Re-Factoring | Solution: Use wait( ) with timeout.<br>Conflicts: It could affect the efficiency. |
| Comments | |

Antipattern Template Example #35—Premature Join( ) call.

| | |
|---|---|
| Name | Premature join( ) call |
| Description | A call to the join( ) method of a thread is premature if this thread has not been started at the time of the call. In Java such calls are simply ignored, but their presence is alarming because they may indicate a fault in the program logic or non-optimal code. |
| Category | Quality and style problem. |
| Example | |
| Detection | A data flow analysis is needed, but dynamic analysis could be more efficient.<br>Detectable by Flavers. |
| Re-Factoring | Solution: Rethink the logic of the program to make sure that the join( ) method of a thread is not called until it is already started.<br>Conflicts: None. |
| Comments | |

Antipattern Template Example #36—Dead Interactions.

| | |
|---|---|
| Name | Dead interactions |
| Description | The antipattern appears when a thread calls another thread after the target thread has already terminated. |
| Category | Quality and style problem |
| Example | |
| Detection | A data flow analysis is needed, but dynamic analysis could be more efficient.<br>Detectable by Flavers. |
| Re-Factoring | Solution: Rethink the logic of the program to make sure that the call to a thread is not made after the thread has terminated.<br>Conflicts: None. |
| Comments | |

Antipattern Template Example #37—Calling Join ( ) for an immortal thread.

| Name | Calling join( ) for an immortal thread |
|---|---|
| Description | The problem occurs when join( ) is called for a thread that would not terminate such as a daemon or the main thread. |
| Category | Efficiency problem. |
| Example | |
| Detection | A data flow analysis is needed, but dynamic analysis could be more efficient. Detectable by Flavers. |
| Re-Factoring | Solution: Rethink the logic of the program to make sure that join( ) is called only for threads that would terminate. Conflicts: None. |
| Comments | |

Figure 2:
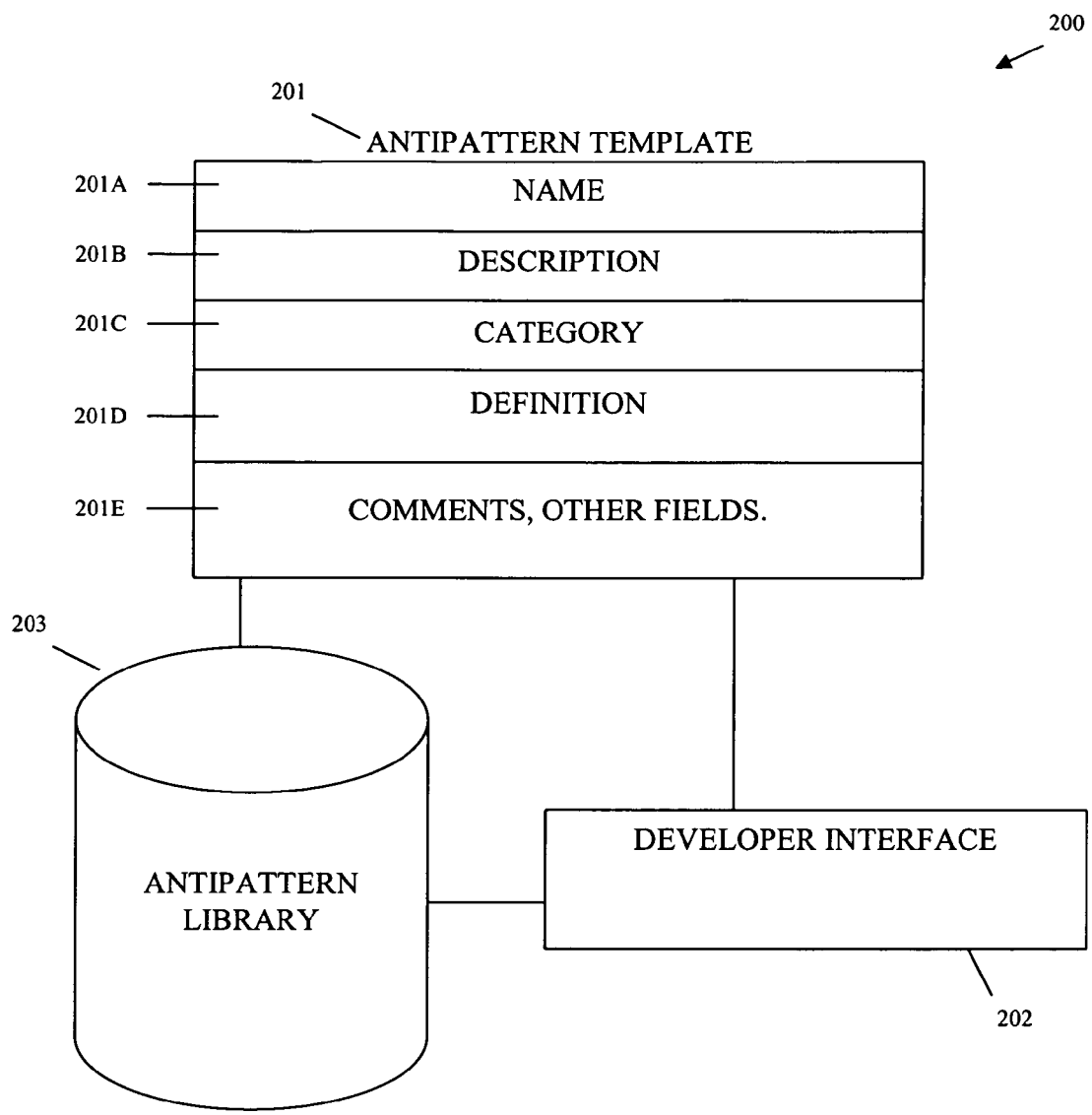
FIG. 2 is a diagram of an antipattern analysis system, according to an example embodiment of the invention.

FIG. 2 is diagram of an antipattern analysis system 200, according to an example embodiment of the invention. The antipattern analysis system 200 is implemented in a machine-accessible or computer-readable medium and is optionally accessible over a network. The network may be wired, wireless, or a combination of wired and wireless. In an embodiment, the antipattern analysis system 200 implements, among other things, the processing of the method 100 depicted in FIG. 1.

The antipattern analysis system 200 includes an antipattern template 201 and a developer interface 202. In an embodiment, the antipattern analysis system 200 also includes an antipattern library 203.

The antipattern template 201 includes a variety of fields 201A-201E. In an embodiment, the antipattern template 201 includes a name field 201A, a description field 201B, a category field 201C, a definition field 201D, and a comment field or other fields 201E. According to some embodiments, the antipattern template 201 is implemented according to the fields depicted above with the example antipattern template presented with the discussion of FIG. 1.

The name field 201A identifies an antipattern with a title. The description field 201B provides a more detailed exposition of the antipattern. The category field 201 C classifies the antipattern into an antipattern category. The definition field 201D describes how to detect the antipattern; in other words it describes the patterns or conditions that are checked within a multithreaded application to detect the antipattern. The definition field 201D may also identify or reference one or more analysis tools that are capable of detecting the patterns or conditions associated with the antipattern. The comments or other fields 201E may be reserved for other uses, such as some of the ones presented above with respect to the antipattern template of FIG. 1.

In an embodiment, a variety of antipattern templates 201 instances are housed in an antipattern library 203. Examples of 37 of such instances were presented above with respect to FIG. 1. The antipattern library 203 may index the antipattern templates 201 based on the fields 201A-201E or keywords included within the fields 201A-201E and make the information searchable. The antipattern library may also include a search and retrieval interface accessible to the developer interface 202.

The developer interface 202 is adapted to process analysis tools against multithreaded applications using the information presented in the fields 201A-201E of the antipattern template 201. Thus, the developer interface 202 is familiar with the format of the antipattern template 201 and the fields 201A-201E. In an embodiment, the developer interface 202 may dynamically resolve the format of the antipattern template 201 by using a schema associated with the antipattern template 201. The schema may be in a generic language, such as Extensible Markup Language (XML), and the like.

The developer interface 202 selectively presents or displays information about an antipattern template 201 to a developer via a GUI. During operation, a developer then selects a particular antipattern template 201 for processing against a multithreaded application. The fields 201A-201E relating the selected antipattern template 201 are useful to help the developers of multithreaded applications and the professionals building tools to detect the presence of antipatterns in multithreaded programs when the fields 201A-201E are combined with the processing of the developer interface 202 and a proper analysis tool.

Once an antipattern template 201 is selected within the developer interface 202, the developer interface 202 can resolve an analysis tool to process the definition field 201 D against the multithreaded application for patterns or conditions associated with the antipattern which is being represented by the antipattern template 201. In some cases, the developer interface 202 automatically determines the proper analysis tool based on values associated with the category field 201C or references or links included in the definition field 201D. In other cases, the developer interface 202 permits a developer to select or override a particular analysis tool.

The developer interface 202 is also adapted to present results associated with the processing of the selected analysis tool. In an embodiment, the developer interface 202 presents to a developer as a GUI window or a platform. The developer can access different segmented regions of the GUI for purposes of loading a multithreaded application, selecting from the antipattern library 203 a specific instance of an antipattern template 201, and executing an analysis tool for the specific antipattern template 201 against the multithreaded application. The GUI may also present the results of the analysis tool's processing in real-time and dynamic fashion. In another embodiment, the developer interface 202 may be represented by the processing of the method 100 presented above with the discussion of FIG. 1.

The analysis tool may be an existing tool, such as JLint or FindBugs or a custom-developed tool designed to specifically scan or parse a multithreaded application for antipatterns defined by antipattern definitions 201D. The antipattern definitions 201D may be associated with race conditions, deadlock conditions, and/or lovelock conditions. Moreover, the antipattern definitions 201 D may be associated with software quality concerns and/or run-time performance concerns. The analysis tool may be adapted to statically scan the source code of the multithreaded application or adapted to dynamically evaluate the runtime condition and performance of an executing version of the multithreaded application.

Figure 3:
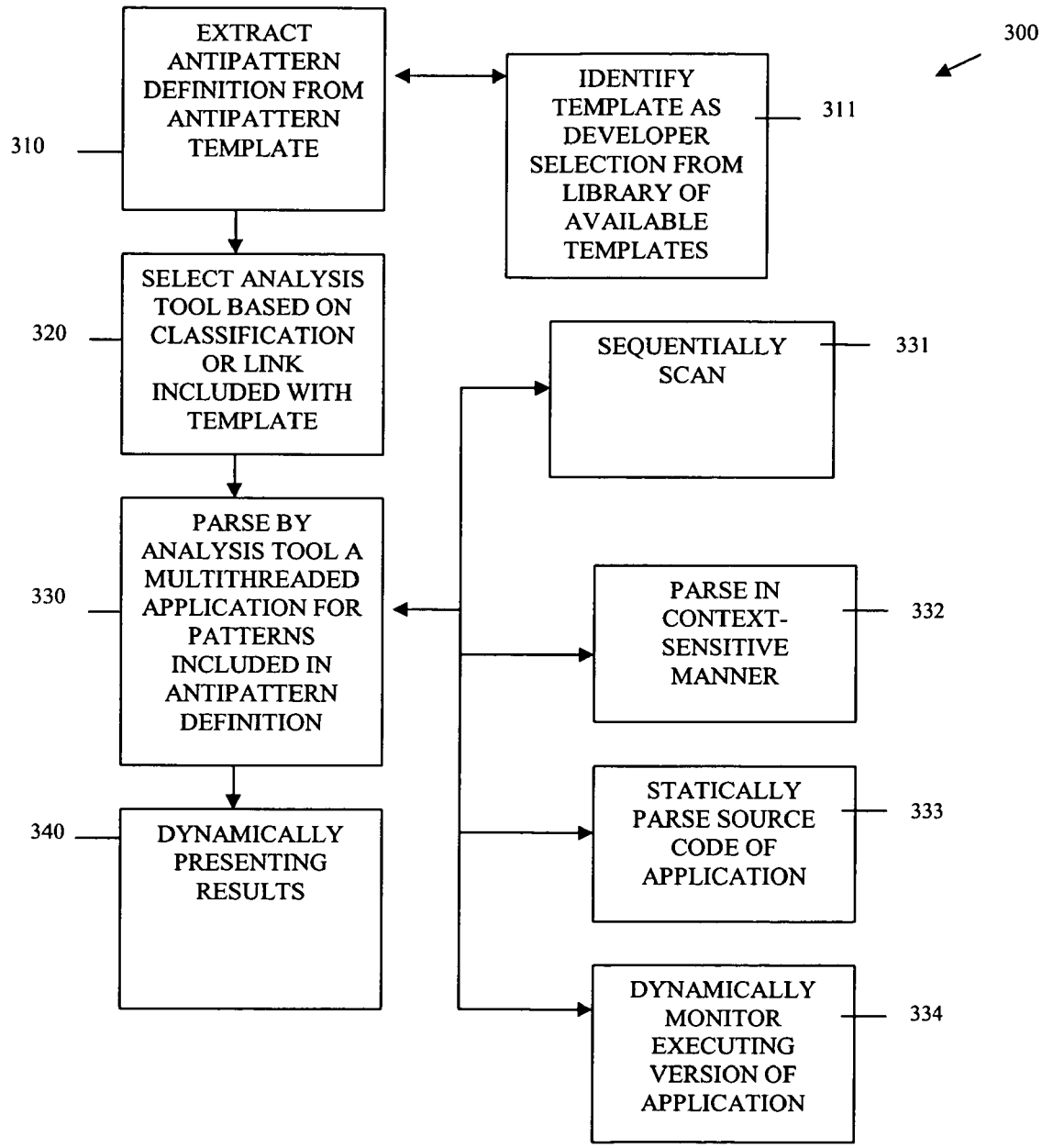
FIG. 3 is a diagram of another method for processing an antipattern test, according to an example embodiment.

FIG. 3 is a diagram of another method 300 for processing an antipattern test, according to an example embodiment. The method 300 (herein after "antipattern detection instructions") is implemented in a machine-accessible or computer-readable medium and is optionally accessible over a network. The network may be wired, wireless, or a combination of wired and wireless.

The antipattern detection instructions may reside on removable, fixed, or a combination of removable and fixed media. Furthermore, the antipattern detection instructions may be downloaded from a remote server or site to a machine, prefabricated within in memory and/or storage of a machine, or uploaded from removable media to a machine. The antipattern detection instructions when loaded into a machine and processed perform the processing depicted by the method 300 of FIG. 3.

Accordingly, at 310, the antipattern detection instructions extract an antipattern definition or detection mechanism from an antipattern template. The template may, at 311, be identified dynamically from a developer selection against a library of available templates. The antipattern detection instructions are familiar with the format of the templates and have an interface to the library for searching and retrieving instances of the templates. In an embodiment, the antipattern detection instructions may dynamically determine how to extract the antipattern definition using an XML schema associated with the templates. In this manner, the antipattern detection instructions may be generically implemented independent of any specific antipattern template data format.

At 320, the antipattern detection instructions select an analysis tool based on a classification or link included within the template. Again, each type of antipattern may be processed by a different analysis tool. Thus, to account for this that antipattern detection instructions uses information included in the antipattern template to resolve which analysis tool to process. The information may be included as a direct link to a specific analysis tool within the template or the information may be resolved from a classification associated with the template.

According to an embodiment, the analysis tool may be manually selected by a developer or may be overridden by a developer interfaced to the antipattern detection instructions. The analysis tool may be a commercially available analysis tool, such as but not limited to, JLint and FindBugs. Alternatively, custom analysis tools may be developed to look for antipatterns not currently covered by a commercial analysis tool.

At 330, the analysis tool, parses the multithreaded application for patterns included in the antipattern definition. Again, the antipattern definition is acquired from the antipattern template. The definition may be written in a format that the analysis tool recognizes or may be converted automatically into a format that the analysis tool recognizes by the antipattern detection instructions.

In an embodiment, at 331, the analysis tool may sequentially scan the multithreaded application's source code looking for patterns or conditions represented in the antipattern definition. In another embodiment, at 332, the analysis tool may parse the multithreaded application in a context-sensitive or state-driven manner for purposes of detecting the patterns or conditions represented in the antipattern definition of the antipattern template.

In yet more embodiments, at 333, the analysis tool may statically scan the source code of the multithreaded application for the patterns or conditions defined by the antipattern definition. Alternatively, at 334, the analysis tool may dynamically analyze, monitor, or evaluate an executing version of the multithreaded application for purposes of detecting conditions or performance patterns represented by the antipattern definition.

At 340, the antipattern detection instructions dynamically present the results associated with the processing of the analysis tool. Thus, a developer may dynamically visualize the results associated with the analysis tool as the analysis tool attempts to detect patterns or conditions in the multithreaded application which represent antipatterns. In some embodiments, the results may be also sent to a file for subsequent viewing by the developer or subsequent analysis.

It is now appreciated, how antipatterns representing coding deficiencies may be represented as templates and housed in a library. Techniques presented allow specific templates to be acquired from the library and associated with appropriate analysis tools. The analysis tools process against a multithreaded application looking for antipatterns defined by the templates. Results associated with the processing are dynamically supplied to a developer for evaluation. The techniques presented herein streamline and automate the process of detecting coding deficiencies in multithreaded applications.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method residing in a computer-readable medium and to execute on a computer for performing the method, including:

identifying, via a graphical user interface (GUI), a multithreaded application, the multithreaded application is a multiple and duplicate instance of a second multithreaded application, the multithreaded application and the second multithreaded application concurrently process at a same time and within a same execution environment competing for or sharing memory and processor resources with one another within that same execution environment;

receiving, via the GUI, a selection for an antipattern test from a library of available antipattern tests via a template;

presenting, via the GUI, the template and displaying within the GUI sample code that illustrates problems that the antipattern test is designed to detect;

defining, via the GUI and within the antipattern test conditions or patterns for identifying the problems in the multithreaded application;

associating, via the GUI, the antipattern test with antipatterns occurring with multithreading and within the multithreaded application, and the problems include at least some conditions or patterns that identify when the multithreaded application produces a wrong output or produces no output;

determining, via the GUI, an analysis tool in response to the selection;

processing, via the GUI, the analysis tool against the multithreaded application for the antipattern test for purposes of detecting coding deficiencies in the multithreaded application as defined by the antipattern test and at least one deficiency related to incorrect output produced by the multithreaded application, and processing includes: parsing the template associated with the antipattern test for a definition field that identifies the conditions or the patterns that the analysis tool attempts to match within the multithreaded application, processing also includes at least one of: sequentially scanning, by the analysis tool, the multithreaded application for the conditions or the patterns included in the definition; and parsing, by the analysis tool, the multithreaded application in a context-sensitive manner to detect the conditions or the patterns included in the definition; and simultaneously presenting within the GUI the selected antipattern test, the library of available antipattern tests, an identifier associated with the analysis tool, and results associated with the processing of the analysis tool.

2. The method of claim 1, wherein identifying further includes receiving a file identifier associated with the multithreaded application.

3. The method of claim 1, wherein receiving further includes presenting the available antipattern tests within the GUI as a list of selectable items, and the selection is received in response to a selected one of the items that corresponds to the antipattern test.

4. The method of claim 1, wherein processing further includes presenting results associated with the processing within the GUI as the processing proceeds.

5. A computer-implemented system, including:
an antipattern template to process as instructions on a computer;
a developer interface that processes as other instructions on the computer, the antipattern template includes an antipattern definition and a link to an analysis tool, and the antipattern template identifies conflicts that occurs when applying a proposed solution to problems detected with the antipattern definition, and the developer interface is adapted to process the analysis tool with the antipattern definition against a multithreaded application and further adapted to present results, within the developer interface and the results are associated with the processing as coding deficiencies are being detected within the multithreaded application, and the antipattern definition is associated with the problems that occur with multithreading processing and as detected within the multithreaded application, and the problems include at least some conditions or patterns from the antipattern definition that identify when the multithreaded application produces a wrong output or produces no output, the developer interface presenting some results showing incorrect output produced by the multithreaded application to a developer, and the multithreaded application is a multiple and duplicate instance of a second multithreaded application, the multithreaded application and the second multithreaded application concurrently process at a same time and within a same execution environment competing for or sharing memory and processor resources with one another within that same execution environment; and
the antipattern template is parsed for a definition field that identifies the conditions or the patterns that the analysis tool attempts to match within the multithreaded application, the analysis tool also performs one of: sequentially scanning the multithreaded application for the conditions or the patterns included in the antipattern definition; and parsing the multithreaded application in a context-sensitive manner to detect the conditions or the patterns included in the antipattern definition; the developer interface also presents the antipattern definition, a library of available antipattern definitions, an identifier associated with the analysis tool, and results associated with the processing of the analysis tool.

6. The system of claim 5 further including, an antipattern library that includes the antipattern template and a plurality of additional antipattern templates, and wherein the developer interface is adapted to present the library and receive selections associated with the library.

7. The system of claim 6, wherein the antipattern template and the additional antipattern templates include classification types, wherein each classification type corresponds to a particular one of the coding deficiencies.

8. The system of claim 7, wherein additional links associated with the additional antipattern templates include a plurality of additional analysis tools, and wherein a particular analysis tool is assigned to a particular one of the additional antipattern templates in response to a specific one of the classification types.

9. The system of claim 5, wherein the developer interface is a graphical user interface having a plurality of segmented areas, and wherein at least one of the segmented areas is adapted to dynamically present the results while the analysis tool processes against the multithreaded application.

10. The system of claim 5, wherein the antipattern definition is associated with at least one of a race condition, a deadlock condition, and a livelock condition.

11. The system of claim 5, wherein the antipattern definition is associated with at least one of a software quality concern and a run-time performance concern.

12. The system of claim 5, wherein the analysis tool is adapted to process against the multithreaded application by at least one of a static analysis of source code associated with the multithreaded application and a dynamic analysis associated with an executing version of the multithreaded application.

13. A computer-readable storage medium including instructions thereon, the instructions when processed by a computer perform the method of:
extracting an antipattern definition from an antipattern template, the antipattern definition is associated with problems that occur with multithreading processing as detected within a multithreaded application, and the antipattern template identifies conflicts that occur when applying a proposed solution to the problems detected with the antipattern definition, definition;
identifying that the problems include at least some conditions or patterns that indicate the multithreaded application produces a wrong output or produces no output, and the multithreaded application is a multiple and duplicate instance of a second multithreaded application, the multithreaded application and the second multithreaded application concurrently process at a same time and within a same execution environment competing for or sharing memory and processor resources with one another within that same execution environment;
selecting an analysis tool in response to at least one of a classification associated with the antipattern definition and a reference link, the classification and/or link are included in the antipattern template;
parsing, by the analysis tool, the multithreaded application for patterns included in the antipattern definition;
parsing the antipattern template associated with an antipattern test for a definition field that identifies the conditions or the patterns that the analysis tool attempts to match within the multithreaded application;
processing one of: sequentially scanning, by the analysis tool, the multithreaded application for the conditions or the patterns included in the definition; and parsing, by the analysis tool, the multithreaded application in a context-sensitive manner to detect the conditions or the patterns included in the definition; and simultaneously presenting within a GUI the selected antipattern test, a library of available antipattern tests, an identifier associated with the analysis tool, and results associated with the processing of the analysis tool.

14. The medium of claim 13 further including instructions for dynamically presenting results associated with the parsing within a graphical user interface.

15. The medium of claim 13 further including instructions for identifying the antipattern template as a developer selection made from a library of available antipattern templates.

16. The medium of claim 13, wherein the parsing instructions further include at least one:

sequentially scanning, by the analysis tool, the multithreaded application for the patterns of the antipattern definition; and parsing, by the analysis tool, the multithreaded application for the patterns in a context-sensitive manner.

17. The medium of claim 13, wherein the parsing instructions further include at least one of:

statically parsing a source code associated with the multithreaded application for the patterns; and dynamically monitoring an executing version of the multithreaded application for the patterns.

* * * * *